United States Patent
Amano et al.

(10) Patent No.: US 9,405,113 B2
(45) Date of Patent: Aug. 2, 2016

(54) MICROSCOPE FOCUSING MECHANISM WITH MOVABLE COMPONENTS FORMED OF MATERIALS HAVING DIFFERENT LINEAR EXPANSION COEFFICIENTS

(71) Applicant: OLYMPUS CORPORATION, Shibuya-ku, Tokyo (JP)

(72) Inventors: Yusuke Amano, Hachioji (JP);
Takayoshi Kamomae, Hachioji (JP);
Yuichi Kataoka, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 144 days.

(21) Appl. No.: 13/926,934

(22) Filed: Jun. 25, 2013

(65) Prior Publication Data

US 2014/0002896 A1    Jan. 2, 2014

(30) Foreign Application Priority Data

Jun. 29, 2012   (JP) ................................. 2012-147886

(51) Int. Cl.
*G02B 21/06*  (2006.01)
*G02B 21/26*  (2006.01)

(52) U.S. Cl.
CPC ...................................... *G02B 21/26* (2013.01)

(58) Field of Classification Search
CPC .... G02B 21/16; G02B 21/24; G02B 21/0012; G02B 21/0088; G02B 21/248
USPC ......................................................... 359/386
See application file for complete search history.

(56) References Cited

U.S. PATENT DOCUMENTS 5,703,715 A    12/1997  Gaul
2007/0157712 A1*  7/2007  Amakusa ........................ 73/105

FOREIGN PATENT DOCUMENTS

| JP | 06109963 A | 4/1994 |
| JP | 06222275 A | 8/1994 |
| JP | 07055512 A | 3/1995 |
| JP | 09-120030 A | 5/1997 |

OTHER PUBLICATIONS

Japanese Office Action (and English translation thereof) dated Jun. 7, 2016, issued in counterpart Japanese Application No. 2012-147886.

* cited by examiner

*Primary Examiner* — Bumsuk Won
*Assistant Examiner* — Tamara Y Washington
(74) *Attorney, Agent, or Firm* — Holtz, Holtz & Volek PC (57) ABSTRACT

A microscope focusing mechanism includes a fixing part attached to a microscope main body, a fixing-side guide member attached to the fixing part, a plate-shaped base part that supports at least one of a stage for placing a specimen and a revolver to which multiple objective lenses are detachably attached, a moving-side guide member that is fixed to the base part, that is connected to the fixing-side guide member, and that is movable in a direction of an optical axis of one of the objective lenses, and a plate member that is arranged on a side of the base part opposite to a side where the moving-side guide member is arranged. A linear expansion coefficient of a material of each of the moving-side guide member and the plate member differs from a linear expansion coefficient of a material of the base part.

4 Claims, 6 Drawing Sheets

MICROSCOPE FOCUSING MECHANISM WITH MOVABLE COMPONENTS FORMED OF MATERIALS HAVING DIFFERENT LINEAR EXPANSION COEFFICIENTS

CROSS-REFERENCE TO RELATED APPLICATIONS

This application is based upon and claims the benefit of priority from Japanese Patent Application No. 2012-147886, filed on Jun. 29, 2012, the entire contents of which are incorporated herein by reference.

BACKGROUND

1. Technical Field

The disclosure relates to a microscope focusing mechanism included in a microscope for illuminating a specimen with illumination light and receiving reflected or transmitted light from the specimen to observe the specimen.

2. Related Art

In the fields of medicine, biology, and the like, microscopes for illuminating a specimen for observation are used to observe cells or the like. Furthermore, in the field of industry, microscopes are used for various purposes, such as management of quality of metallographic structures, research and development of new materials, or examination of electronic devices or magnetic heads. As the observation of a specimen by the microscope, a monitor observation is known in addition to a visual observation. In the monitor observation, an image of a specimen is captured by using an imaging element such as a CCD or CMOS image sensor and the captured image is displayed on a monitor for observation.

A conventional microscope includes, as disclosed in Japanese Laid-open Patent Publication No. 9-120030 for example, a microscope frame that serves as a base of the microscope and that includes an optical system in the interior thereof. The microscope frame also includes, for example, a stage for placing a specimen, a revolver for replaceably holding a plurality of objective lenses with different magnifications with respect to the specimen, a focusing mechanism that supports the stage, that is movable in a vertical direction along an optical axis of an objective lens, and that adjusts a focus of the objective lens, and an eyepiece for observing an observation image formed by light emitted by the specimen. A lamp house is appropriately attached to the microscope frame to emit illumination light for illuminating a specimen on the stage. Another focusing mechanism may be provided for supporting the revolver in a vertically movable manner, instead of supporting the stage in a vertically movable manner.

The focusing mechanism is disposed on the microscope frame and moves along a guide extending in a specified direction. The focusing mechanism usually needs to have a higher rigidity in order to enable stable focusing operations and to obtain stable observation images. Therefore, a material such as steel or iron is used for a guide of the microscope frame and a guide member of the focusing mechanism. Meanwhile, a material such as aluminum is used for parts other than the guide and the guide member in the entire microscope including the focusing mechanism (a moving unit) in order to reduce weight. Thermal expansion coefficients of steel and iron are smaller than that of aluminum.

SUMMARY

In some embodiments, a microscope focusing mechanism is provided in a microscope main body including a stage for placing a specimen and a revolver to which a plurality of objective lenses for receiving at least light from the specimen are detachably attached. The microscope focusing mechanism adjusts a focus to the specimen by moving one of the revolver and the stage in a direction of an optical axis of one of the objective lenses. The microscope focusing mechanism includes: a fixing part attached to the microscope main body; a fixing-side guide member attached to the fixing part; a plate-shaped base part that supports at least one of the stage and the revolver; a moving-side guide member that is fixed to the base part, that is connected to the fixing-side guide member, and that is movable in the direction of the optical axis; and a plate member that is arranged on a side of the base part opposite to a side where the moving-side guide member is arranged. A linear expansion coefficient of a material of each of the moving-side guide member and the plate member differs from a linear expansion coefficient of a material of the base part.

The above and other features, advantages and technical and industrial significance of this invention will be better understood by reading the following detailed description of presently preferred embodiments of the invention, when considered in connection with the accompanying drawings.

DETAILED DESCRIPTION

Exemplary embodiments of the present invention will be explained in detail below with reference to the accompanying drawings. The present invention is not limited to the following embodiments. In the following descriptions, each drawing to be referred to just schematically illustrates a shape, a size, and a positional relationship to understand the present invention, and therefore, the present invention is not limited to the shape, the size, and the positional relationship illustrated in each drawing.

Figure 1:
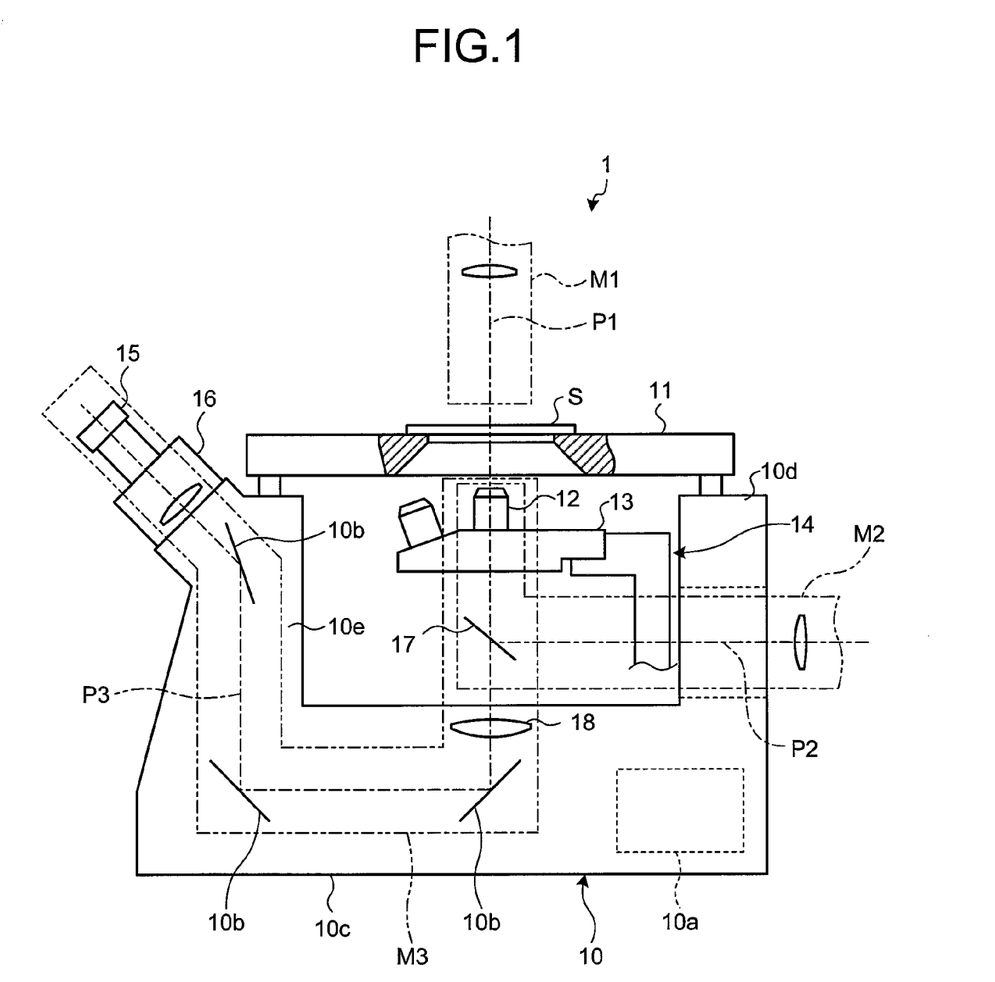
FIG. 1 is a partial cross-sectional view schematically illustrating an overall configuration of a microscope according to an embodiment of the present invention.

A microscope according to an embodiment will be explained in detail below with reference to the drawings. FIG. 1 is a partial cross-sectional view schematically illustrating an overall configuration of a microscope 1 according to the embodiment.

The microscope 1 includes a microscope frame 10 (microscope main body), which serves as a base of the microscope 1 and in which an optical system is disposed. The microscope frame 10 includes, for example, a stage 11 for placing a specimen S; a revolver 13 for holding a plurality of objective lenses 12 with different magnifications such that the objective lenses 12 can be replaced with respect to the specimen S; a focusing mechanism 14 that supports the revolver 13, that is movable in the vertical direction along the optical axis of the objective lens 12, and that adjusts the focus of the objective lens 12; a lens-barrel 16 on which an eyepiece 15 is mounted to observe an observation image formed by light emitted by the specimen S; and a dichroic mirror 17 that reflects light incident on the microscope frame 10 toward the specimen S and that transmits light emitted by the specimen S. The microscope 1 includes an electronic component 10*a* including a control substrate for controlling the entire microscope 1, a power supply, and the like inside the microscope frame 10.

A lamp house that emits illumination light for illuminating the specimen S on the stage 11 is appropriately attached to the microscope frame 10, and the illumination light is applied to the specimen S by illumination optical systems M1 and M2 each being connected to the lamp house. For example, the illumination optical system M1 applies transmitted illumination light, which transmits to the specimen S. For example, the illumination optical system M2 applies epi-illumination light to the specimen S for illuminating the specimen S via the objective lens 12 and the dichroic mirror 17. The illumination optical systems M1 and M2 form optical paths P1 and P2, respectively.

The microscope frame 10 includes an observation optical system M3 (imaging optical system) that includes a tube lens 18, which receives light transmitted through the specimen S via the illumination optical system N1 or light reflected from the specimen S via the illumination optical system M2 (hereinafter, the light will be described as observation light) and which forms an image by the received light, and that includes a plurality of mirrors 10*b* for relaying the image formed by the tube lens 18 to the eyepiece 15. The observation optical system M3 forms an optical path P3. The observation optical system M3 also includes a relay lens and the like in addition to the mirrors 10*b* described above. The observation light that has become a parallel light flux by passing through the objective lens 12 is focused by passing through the tube lens 18, and enters the lens-barrel 16 via the mirrors 10*b* and the relay lens.

The microscope frame 10 includes a base part 10*c* that extends in the front-back direction, a rear wall part 10*d* that extends upward from a rear edge portion of the base part 10*c*, and a front wall part 10*e* that extends upward from a front edge portion of the base part 10*c* such that the microscope frame 10 has an approximately concave shape in the side view. The microscope frame 10 supports the stage 11 at the upper ends of the rear wall part 10*d* and the front wall part 10*e*. An area for arranging the objective lens 12 (the revolver 13) and the dichroic mirror 17 is defined between the rear wall part 10*d* and the front wall part 10*e*.

An upper surface and a lower surface of the stage 11 are flat plate-shaped bodies, and the specimen S is placed on the upper surface. An aperture (through hole), which is small enough to keep the specimen S from falling through, is formed at around the center of the stage 11 so as to transmit the epi-illumination light or the observation light from the specimen S.

The revolver 13 is rotatable and can be moved up and down by the focusing mechanism 14. A plurality of the objective lenses 12 with different magnifications can be mounted on the revolver 13. One of the objective lenses 12 mounted on the revolver 13 is located on the optical axis (for example, a straight line corresponding to the optical path P1).

Figure 2:
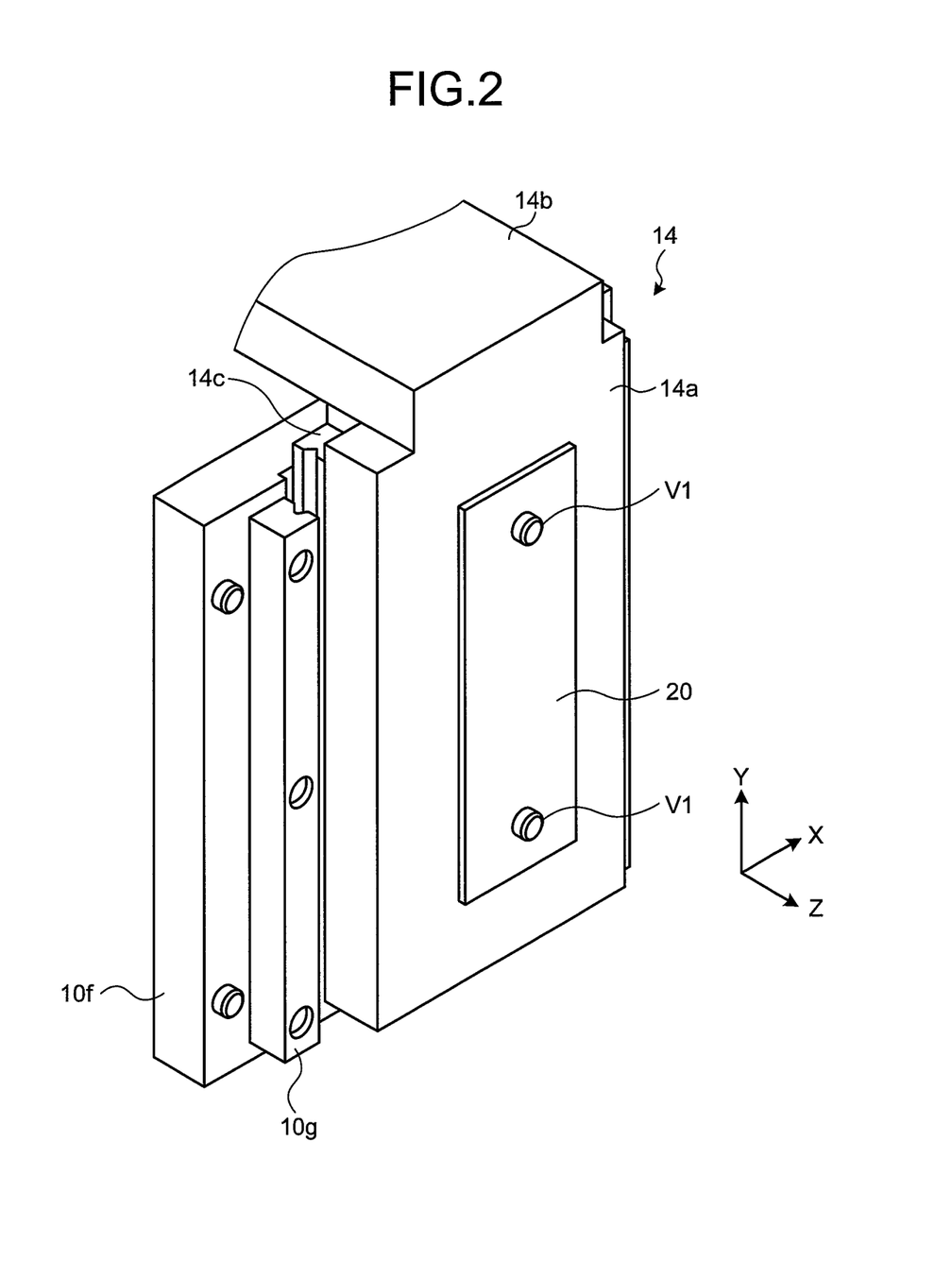
FIG. 2 is a perspective view schematically illustrating a configuration of main parts of the microscope according to the embodiment of the present invention.
Figure 3:
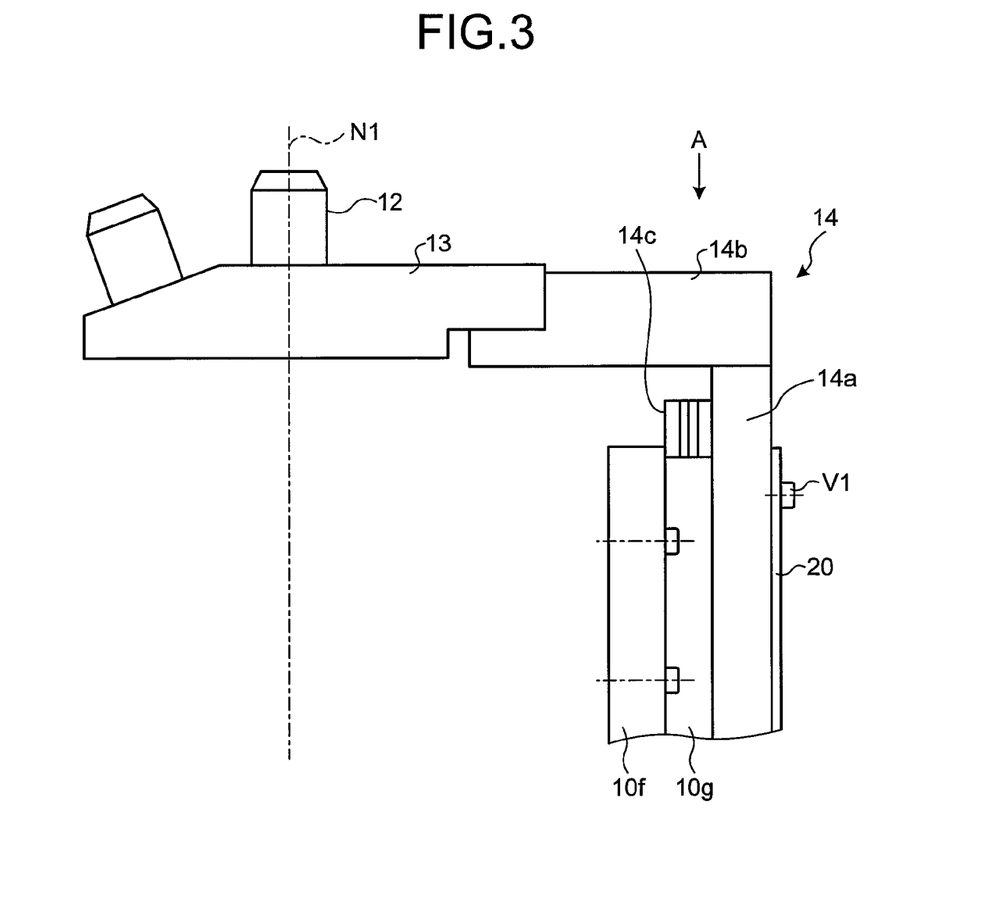
FIG. 3 is a side view schematically illustrating a configuration of the main parts of the microscope according to the embodiment of the present invention.
Figure 4:
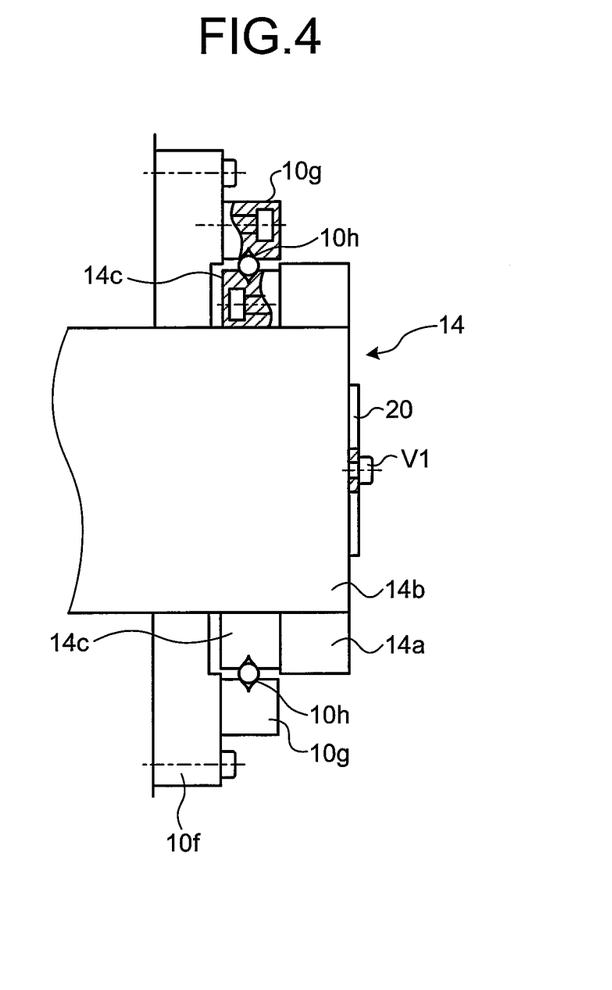
FIG. 4 is a partial cross-sectional view in the direction of arrow A in FIG. 3.

FIG. 2 is a perspective view schematically illustrating a configuration of the focusing mechanism 14 of the microscope 1 according to the embodiment. FIG. 3 is a side view schematically illustrating the configuration of the focusing mechanism 14 of the microscope 1 according to the embodiment. FIG. 4 is a partial cross-sectional view in the direction of arrow A in FIG. 3.

The focusing mechanism 14 is used to adjust the focus of the objective lens 12 to the specimen S. By operating the focusing mechanism 14, the revolver 13 is moved up and down to adjust the focus of the objective lens 12 on the revolver 13 to the specimen S. As illustrated in FIG. 2, the focusing mechanism 14 is disposed on the microscope frame 10 and attached to a fixing part 10*f* extending in the extending direction of the rear wall part 10*d*.

The fixing part 10*f* is disposed so as not to contact with the illumination optical system M2. Two columnar fixing-side guide members 10*g* are provided on the fixing part 10*f* and fixed with screws at positions so as to sandwich the focusing mechanism 14. A metal made mostly of aluminum (including aluminum alloy) is used for the fixing part 10*f*.

The focusing mechanism 14 includes a plate-shaped base part 14*a*, a revolver support part 14*b*, and two columnar moving-side guide members 14*c*. The revolver support part 14*b* continues into one end of the base part 14*a*, extends in a direction perpendicular to the principal surface of the base part 14*a*, and supports the revolver 13 at an end portion in the extending direction. The two columnar moving-side guide members 14*c* are fixed with screws to the principal surface of the base part 14*a*, respectively connected to the fixing-side guide members 10*g* so as to form pairs, and guide the movement of the focusing mechanism 14. The base part 14*a* supports the revolver 13 via the revolver support part 14*b*. Metal made mostly of aluminum (including aluminum alloy) is used for the base part 14*a* and the revolver support part 14*b* in order to reduce weight. Steel or iron with high rigidity is used for the moving-side guide members 14*c* and the fixing-side guide members 10*g* in view of oscillation that occurs when observation is performed or when the base part 14*a* is moved.

The fixing-side guide members 10*g* are connected to outer surfaces of the moving-side guide members 14*c*. The fixing-side guide members 10*g* and the moving-side guide members 14*c* are connected to each other via ball guides 10*h* arranged along the extending direction of the fixing-side guide members 10*g*. With this structure, the moving-side guide members 14*c* can move along the extending direction of the fixing-side guide members 10*g*. A driving force for the movement is transmitted to the moving-side guide members 14*c* by a not-shown drive transmission mechanism (for example, rack and pinion). The drive transmission mechanism may directly receive the amount of the movement according to the amount of rotation of a focus handle or may electrically receive the amount of the movement according to an operation of pressing an input button or the like.

On a principal surface of the base part 14*a* opposite to the principal surface on which the moving-side guide members 14*c* are arranged, a plate member 20 that is made of metal (steel) composed mostly of iron and that has approximately the same length as the moving-side guide members 14*c* is disposed. The plate member 20 is attached with screws V1 such that a principal surface of the plate member 20 and the principal surface of the base part 14*a* come into contact with each other. The plate member 20 is in contact with the principal surface of the base part 14*a* without space. The plate member 20 is arranged on the principal surface of the base part 14*a* at a position corresponding to a middle position between the two moving-side guide members 14*c*.

In the inverted microscope having the above-described configuration, in the case of transmitted-light illumination, when transmitted illumination light from the illumination optical system M1 is applied to the specimen S on the stage 11, light transmitted through the specimen S enters the objective lens 12, is focused by the imaging optical system M3, and is visually observed by an observer through the eyepiece 15 via the mirrors 10b. The transmitted light observation is used to perform a bright field observation, a phase contrast observation, a differential interference observation, and the like. In the case of the transmitted-light illumination, the dichroic mirror 17 is not mounted.

Meanwhile, in the case of epi-illumination, a wavelength of epi-illumination light from the illumination optical system M2 is selected by an excitation filter (not shown) or the like, and the epi-illumination light is reflected by the dichroic mirror 17 toward the objective lens 12. When the illumination light reflected by the dichroic mirror 17 is illuminated onto the specimen S on the stage 11 via the objective lens 12, a fluorescent dye or fluorescent protein in a cell of the specimen S for example is excited and fluorescent light is emitted. The emitted fluorescent light is incident on the objective lens 12, and the light is transmitted through the dichroic mirror 17, focused by the imaging optical system M3, and visually viewed by an observer through the eyepiece 15 via the mirrors 10b.

In some cases, the microscope frame or the focusing mechanism that fix the guides may thermally expands due to a heat source of the microscope 1 (e.g., heat generated by a light source or an electronic component of the illumination optical system) or due to a change in the temperature of a surrounding environment. Specifically, due to a difference between a material of the base part 14a and the revolver support part 14b that are mainly made of aluminum and a material of the moving-side guide members 14c that are mainly made of iron, the amount of expansion and contraction due to the thermal expansion differs, resulting in warp deformation. Conventionally, if the revolver support part 14b is inclined due to the warpage of the base part 14a, the focus may be deviated and an optical axis N1 of the objective lens 12 may be inclined.

By contrast, in the embodiment, because the moving-side guide members 14c and the plate member 20 that are made of metal composed mostly of, for example, iron with a smaller linear expansion coefficient than that of aluminum are arranged so as to sandwich the base part 14a that is made of aluminum, it is possible to prevent warpage of the base part 14a. In particular, assuming that a plane parallel to the principal surface of the base part 14a is an XY plane, it is possible to prevent warpage in the Z direction perpendicular to the XY plane. Therefore, it is possible to prevent the optical axis N1 of the objective lens 12 from being inclined due to the warpage of the base part 14a.

According to the above-described embodiment as described above, in the focusing mechanism 14, the moving-side guide members 14c and the plate member 20 that are made of a material with a smaller linear expansion coefficient than that of the base part 14a are arranged on the surfaces of the base part 14a so as to sandwich the base part 14a. Therefore, it is possible to maintain the optical performance of the microscope 1 without influence of thermal expansion of each part.

Furthermore, according to the above-described embodiment, it is sufficient to arrange the plate member 20 on the base part 14a. Therefore, assembly can be performed easily and thermal expansion of each part can be dealt with at low costs.

In the above embodiment, the base part 14a is made of aluminum and the moving-side guide members 14c and the plate member 20 are made of metal (steel) composed mostly of iron. However, any materials may be applicable as long as the linear expansion coefficient of a material of the moving-side guide members 14c and the plate member 20 differs from the linear expansion coefficient of a material of the base part 14a and as long as warpage can be prevented. The above-described materials with different linear expansion coefficients include the same type (category) of materials with different linear expansion coefficients, in addition to different types of materials such as aluminum and steel as explained above. For example, although both of A5052 and ADC12 are the same types of aluminum alloys, the linear expansion coefficient of A5052 is about $24 \times 10^{-6}$ and the linear expansion coefficient of ADC12 is about $21 \times 10^{-6}$. Therefore, A5052 and ADC12 that are aluminum alloys can be employed as materials with different linear expansion coefficients that differ from each other by about 10%. In addition, the moving-side guide members 14c and the plate member 20 may be made of different materials from one another within a range as described above.

Furthermore, while the longitudinal length of the plate member 20 is approximately the same as that of the moving-side guide member 14c, the present invention is not limited thereto. It is sufficient that the plate member 20 has a length enough to prevent the warp deformation. Moreover, while the plate member 20 is disposed at the middle position between the moving-side guide members 14c, the present invention is not limited thereto. It is preferable to dispose the plate member 20 at an appropriate position between the moving-side guide members 14c to further prevent the warp deformation.

Furthermore, while the plate member 20 is arranged on one of the principal surfaces of the base part 14a opposite to the other principal surface on which the moving-side guide members 14c are arranged, the plate member 20 may be arranged between the moving-side guide members 14c on the other principal surface where the moving-side guide members 14c are arranged.

Moreover, while the moving-side guide members 14c are two columnar members, a single plate-shaped member may be employed. In this case, the plate member 20 is arranged on one of the principal surfaces of the base part 14a opposite to the other principal surface on which the moving-side guide members 14c are arranged.

Figure 5:
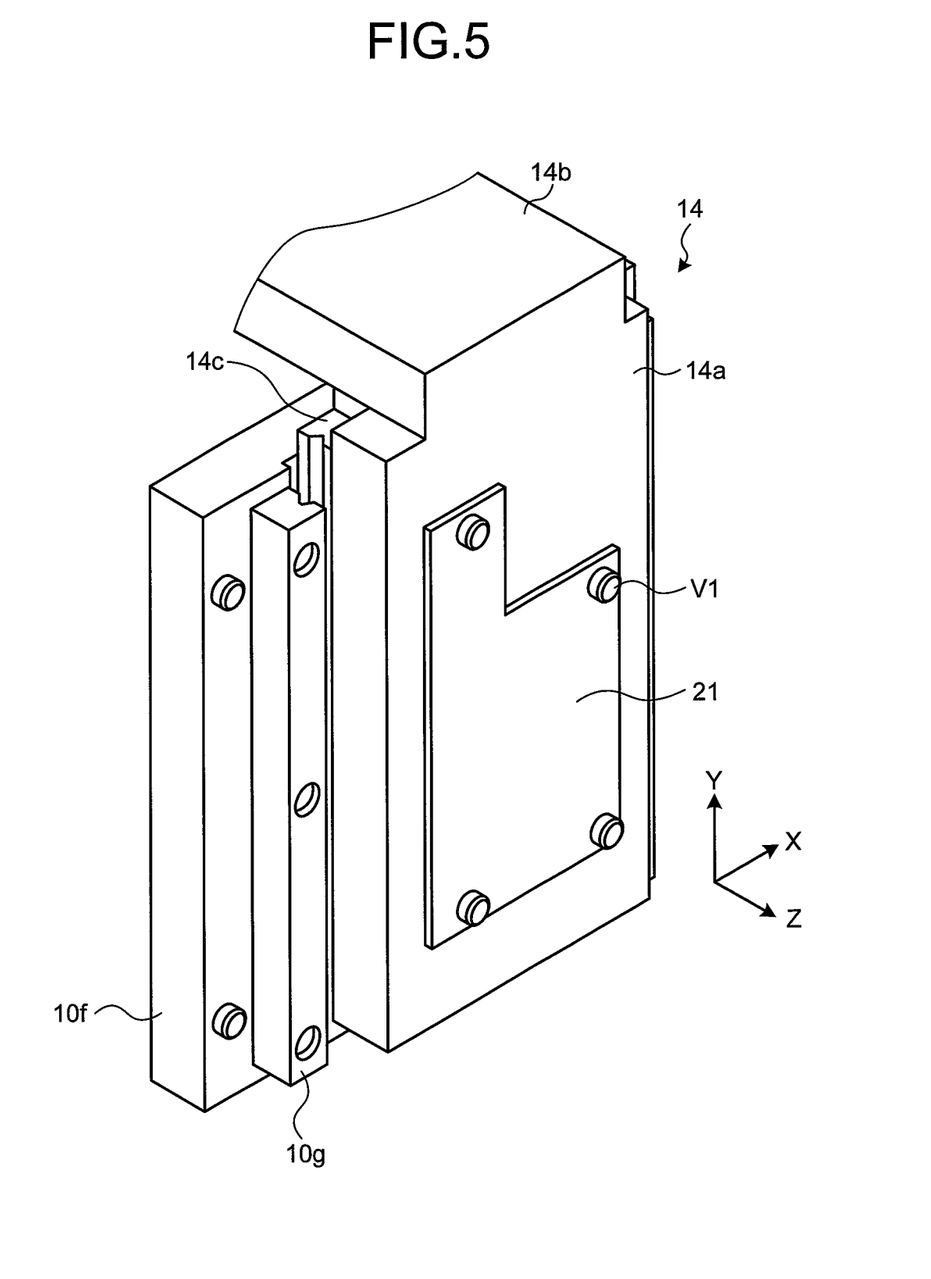
FIG. 5 is a perspective view schematically illustrating a configuration of main parts of a microscope according to a first modification of the embodiment of the present invention.

FIG. 5 is a perspective view schematically illustrating a configuration of main parts of the microscope 1 according to a first modification of the embodiment. The same components as those described in FIG. 2 etc. are denoted by the same reference numerals and symbols. In the above embodiment, the principal surface of the plate member 20 has a rectangular shape. However, a plate member 21 may be set according to a load applied to the base part 14a, the center of gravity of the base part 14a, or a warping direction. The plate member 21 is made of metal (steel) composed mostly of iron, for example.

The plate member 21 illustrated in FIG. 5 has a stepped shape in which one corner of a rectangular area is notched along lines parallel to respective sides. Specifically, assuming that the principal surface of the base part 14a is an XY plane, the lengths of both ends in each of the X direction and the Y direction differ from each other when the plate member 21 is arranged on the base part 14a. With the differences between the lengths, it becomes possible to reduce the amount of complex warpage in the X and Y directions.

It is possible to change a thickness of the rectangular plate member in order to reduce the complex warpage in the X and Y directions, instead of changing the lengths of both ends of the plate member 21 as explained above in the first modification.

Furthermore, the lengths of both ends in the X and Y directions can be set according to a load applied to the base part 14a by the revolver 13, the center of gravity of the base part 14a, or the warping direction.

Figure 6:
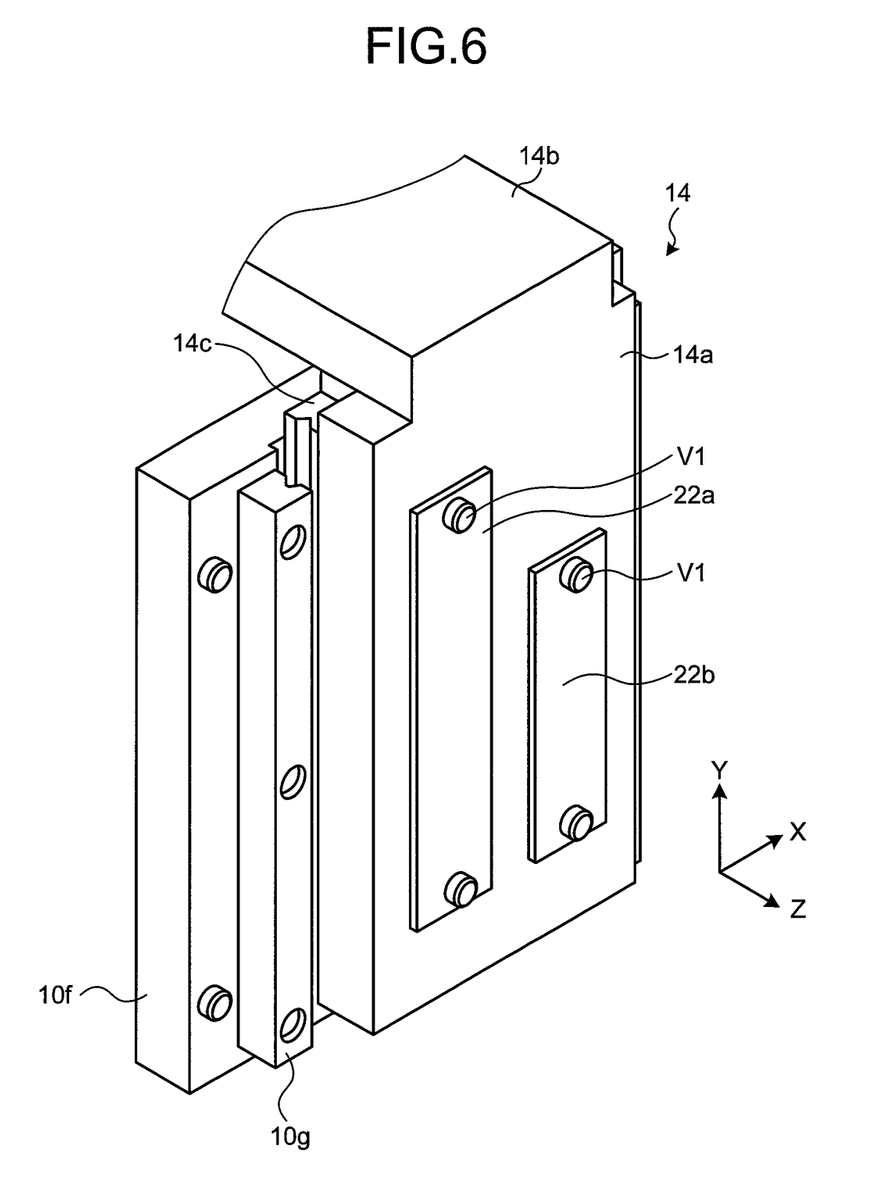
FIG. 6 is a perspective view schematically illustrating a configuration of main parts of a microscope according to a second modification of the embodiment of the present invention.

FIG. 6 is a perspective view schematically illustrating a configuration of main parts of the microscope 1 according to a second modification of the embodiment. The same components as those explained in FIG. 2 etc. are denoted by the same reference numerals and symbols. In the first modification illustrated in FIG. 5, the lengths of both ends in each of the X and Y directions are made different in one plate member. However, it is possible to use a plurality of plate members 22a and 22b with different lengths. The plate members 22a and 22b are made of metal (steel) composed mostly of iron, for example.

In the plate members 22a and 22b illustrated in FIG. 6, at least longitudinal lengths are different from each other. Specifically, when the plate members 22a and 22b are arranged at respective specified positions on the base part 14a, arrangement areas in the longitudinal direction differ from each other. With this difference in the arrangement areas, it is possible to reduce the amount of complex warpage in the X and Y directions if the principal surface of the base part 14a is an XY plane.

The lengths of both ends in the X and Y directions can be changed according to a load applied to the base part 14a by the revolver 13, the center of gravity of the base part 14a, or the warping direction. The plate member may be arranged on a plane where the moving-side guide members 14c are arranged, a plane where the fixing-side guide members 10g attached to the fixing part 10f are arranged, or a plane opposite to the plane where the fixing-side guide members 10g are arranged, instead of arranging the plate members 22a and 22b on a plane of the base part 14a opposite to the plane where the moving-side guide members 14c are arranged.

In the above-described embodiment, a sliding revolver can be employed instead of the rotary revolver 13. The sliding revolver can arrange the desired objective lens 12 to a position below the specimen S via a slider that is slideable in a direction perpendicular to the optical axis N1 of the objective lens 12. In this case, the plate member is arranged at the same position as described above.

Furthermore, in the above embodiment, the focusing mechanism 14 supports the revolver 13. Alternatively, the focusing mechanism 14 may support the stage 11.

While the inverted microscope has been explained as an example in the above embodiment, the present invention may be applied to any apparatuses including a focusing mechanism. For example, the present invention may be applied to an upright microscope or an imaging apparatus such as a video microscope that includes an objective lens for enlarging a specimen and that has functions to capture an image of the specimen via the objective lens and to display the image.

As described above, the microscope focusing mechanism according to the embodiment of the present invention is useful to maintain the optical performance of the microscope without influence of thermal expansion.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A microscope focusing mechanism that is provided in a microscope main body including a stage for placing a specimen and a revolver to which a plurality of objective lenses for receiving at least light emitted from the specimen are detachably attached, and that adjusts a focus to the specimen by moving the revolver in a direction of an optical axis of one of the objective lenses, the microscope focusing mechanism comprising:
   a fixing part attached to the microscope main body;
   a fixing-side guide member attached to the fixing part;
   a plate-shaped base part that supports the revolver;
   a moving-side guide member that is fixed to the base part, that is connected to the fixing-side guide member, and that is movable in the direction of the optical axis; and
   a plate member that is arranged on a side of the base part opposite to a side of the base part to which the moving-side guide member is fixed, the plate member being fixed to the base part such that an entirety of a surface of the plate member facing the base part is in contact with the base part,
   wherein a linear expansion coefficient of a material of each of the moving-side guide member and the plate member differs from a linear expansion coefficient of a material of the base part.

2. The microscope focusing mechanism according to claim 1, wherein:
   a pair of the moving-side guide members and a pair of the fixing-side guide members are provided,
   the moving-side guide members are arranged on one of principal surfaces of the base part, and
   the plate member is arranged on the other one of the principal surfaces of the base part.

3. The microscope focusing mechanism according to claim 2, wherein the plate member is arranged on the other one of the principal surfaces at a position corresponding to a middle position between the pair of moving-side guide members.

4. The microscope focusing mechanism according to claim 1, wherein the linear expansion coefficient of the material of each of the moving-side guide member and the plate member is smaller than the linear expansion coefficient of the material of the base part.

* * * * *